US012115959B2

United States Patent
Weston et al.

(10) Patent No.: US 12,115,959 B2
(45) Date of Patent: Oct. 15, 2024

(54) VEHICLE CONTROL SYSTEM

(71) Applicant: FORD GLOBAL TECHNOLOGIES, LLC, Dearborn, MI (US)

(72) Inventors: Keith Weston, Canton, MI (US); Filip Tomik, Milford, MI (US); Brendan F. Diamond, Grosse Pointe, MI (US); Andrew Denis Lewandowski, Sterling Heights, MI (US); Jordan Barrett, Milford, MI (US); Michael Alan Mcnees, Flat Rock, MI (US); Matthew Johnson, Toledo, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 17/546,783

(22) Filed: Dec. 9, 2021

(65) Prior Publication Data

US 2023/0182700 A1 Jun. 15, 2023

(51) Int. Cl.
| | |
|---|---|
| *B60T 8/00* | (2006.01) |
| *B60T 8/32* | (2006.01) |
| *B60W 10/04* | (2006.01) |
| *B60W 10/18* | (2012.01) |

(52) U.S. Cl.
CPC ............ *B60T 8/321* (2013.01); *B60T 8/3205* (2013.01); *B60W 10/04* (2013.01); *B60W 10/18* (2013.01); *B60T 2210/14* (2013.01); *B60T 2220/02* (2013.01); *B60T 2220/06* (2013.01); *B60W 2520/30* (2013.01); *B60W 2552/35* (2020.02)

(58) Field of Classification Search
CPC ...... B60T 2210/14; B60T 8/1755; B60T 1/00; B60T 3/00; B60T 5/00; B60T 7/00; B60T 8/00; B60T 11/00; B60T 10/00; B60T 13/00; B60T 15/00; B60T 17/00; B60T 2201/00; B60T 2210/00; B60T 2220/00; B60T 2230/00; B60T 2240/00; B60T 2260/00; B60T 2250/00; B60T 2270/00
See application file for complete search history.

(56) References Cited

U.S. PATENT DOCUMENTS

| | | | | |
|---|---|---|---|---|
| 6,272,418 | B1* | 8/2001 | Shinmura | B60T 8/241 701/72 |
| 9,415,657 | B2* | 8/2016 | Kikuchi | B60G 17/06 |
| 9,428,184 | B2* | 8/2016 | Kikuchi | B60W 30/025 |
| 2002/0005662 | A1* | 1/2002 | Yasui | B60T 8/3275 303/175 |
| 2008/0133098 | A1* | 6/2008 | Wang | B60T 8/1755 701/70 |

(Continued)

*Primary Examiner* — Truc M Do
(74) *Attorney, Agent, or Firm* — Vincent Mastrogiacomo; Brooks Kushman P.C.

(57) ABSTRACT

A vehicle includes wheels, brakes, and a controller. The wheels are configured to propel the vehicle. The brakes are configured to generate a braking torque at the wheels. The controller is programed to, in response to (i) a commanded braking torque and (ii) a relative jounce between two of the wheels exceeding a threshold, operate the brakes to increase the braking torque to less than the commanded braking torque. The controller is further programed to, in response to (i) the commanded braking torque and (ii) a droop of at least one of the wheels exceeding a threshold, operate the brakes to increase the braking torque to less than the commanded braking torque.

19 Claims, 4 Drawing Sheets

(56) References Cited

U.S. PATENT DOCUMENTS

| | | | |
|---|---|---|---|
| 2011/0160960 A1* | 6/2011 | Kajino | B60G 17/025 |
| | | | 701/38 |
| 2015/0039199 A1* | 2/2015 | Kikuchi | B60T 8/17555 |
| | | | 701/70 |
| 2015/0224845 A1* | 8/2015 | Anderson | F03G 7/08 |
| | | | 701/37 |
| 2016/0042644 A1* | 2/2016 | Velusamy | G08G 1/096775 |
| | | | 340/435 |
| 2018/0126981 A1* | 5/2018 | Gangwar | G05D 1/0891 |
| 2020/0130660 A1 | 4/2020 | Cho | |
| 2021/0053448 A1 | 2/2021 | Beck et al. | |
| 2022/0063365 A1* | 3/2022 | Chetty | B60W 10/22 |

* cited by examiner

VEHICLE CONTROL SYSTEM

TECHNICAL FIELD

The present disclosure relates to vehicles having drivetrains that are configured to deliver power to one or more drive wheels and braking systems that are configured to reduce the speed of the wheels.

BACKGROUND

Vehicles may include drivetrains that are configured to deliver power from a powerplant to one or more drive wheels.

SUMMARY

A vehicle includes a plurality of wheels, a powerplant, brakes, an accelerator pedal, a brake pedal, and a controller. The powerplant is configured to generate a wheel torque within at least one of the wheels of plurality of wheels to propel the vehicle. The brakes are configured to generate a braking wheel torque within at least one of the wheels of the wheels of the plurality of wheels. The controller is programed to, in response to (i) depressing the accelerator pedal to generate a desired wheel torque and (ii) a droop of least one wheel or a relative jounce between two wheels exceeding a first threshold or a second threshold, respectively, operate the powerplant to increase the wheel torque to less than the desired wheel torque. The controller is further programed to, in response to (i) depressing the accelerator pedal to generate the desired wheel torque and (ii) the droop of each wheel and the relative jounce between each wheel being less than the first threshold and the second threshold, respectively, operate the powerplant to increase the wheel torque to the desired wheel torque. The controller is further programed to, in response to (i) depressing the brake pedal to generate a desired braking wheel torque and (ii) the droop of least one wheel or the relative jounce between two wheels exceeding the first threshold or the second threshold, respectively, operate the brakes to increase the braking wheel torque to less than the desired braking wheel torque. The controller is further programed to, in response to (i) depressing of the brake pedal to generate the desired braking wheel torque and (ii) the droop of each wheel and the relative jounce between each wheel being less than the first threshold and the second threshold, respectively, operate the brakes to increase the braking wheel torque to the desired braking wheel torque.

A vehicle includes wheels, brakes, and a controller. The wheels are configured to propel the vehicle. The brakes are configured to generate a braking torque at the wheels. The controller is programed to, in response to (i) a commanded braking torque and (ii) a droop of at least one of the wheels exceeding a threshold, operate the brakes to increase the braking torque to less than the commanded braking torque. The controller is further programed to, in response to (i) the commanded braking torque and (ii) the droop of each of the wheels being less than the threshold, operate the brakes to increase the braking torque to the commanded braking torque.

A vehicle includes wheels, brakes, and a controller. The wheels are configured to propel the vehicle. The brakes are configured to generate a braking torque at the wheels. The controller is programed to, in response to (i) a commanded braking torque and (ii) a relative jounce between two of the wheels exceeding a threshold, operate the brakes to increase the braking torque to less than the commanded braking torque.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
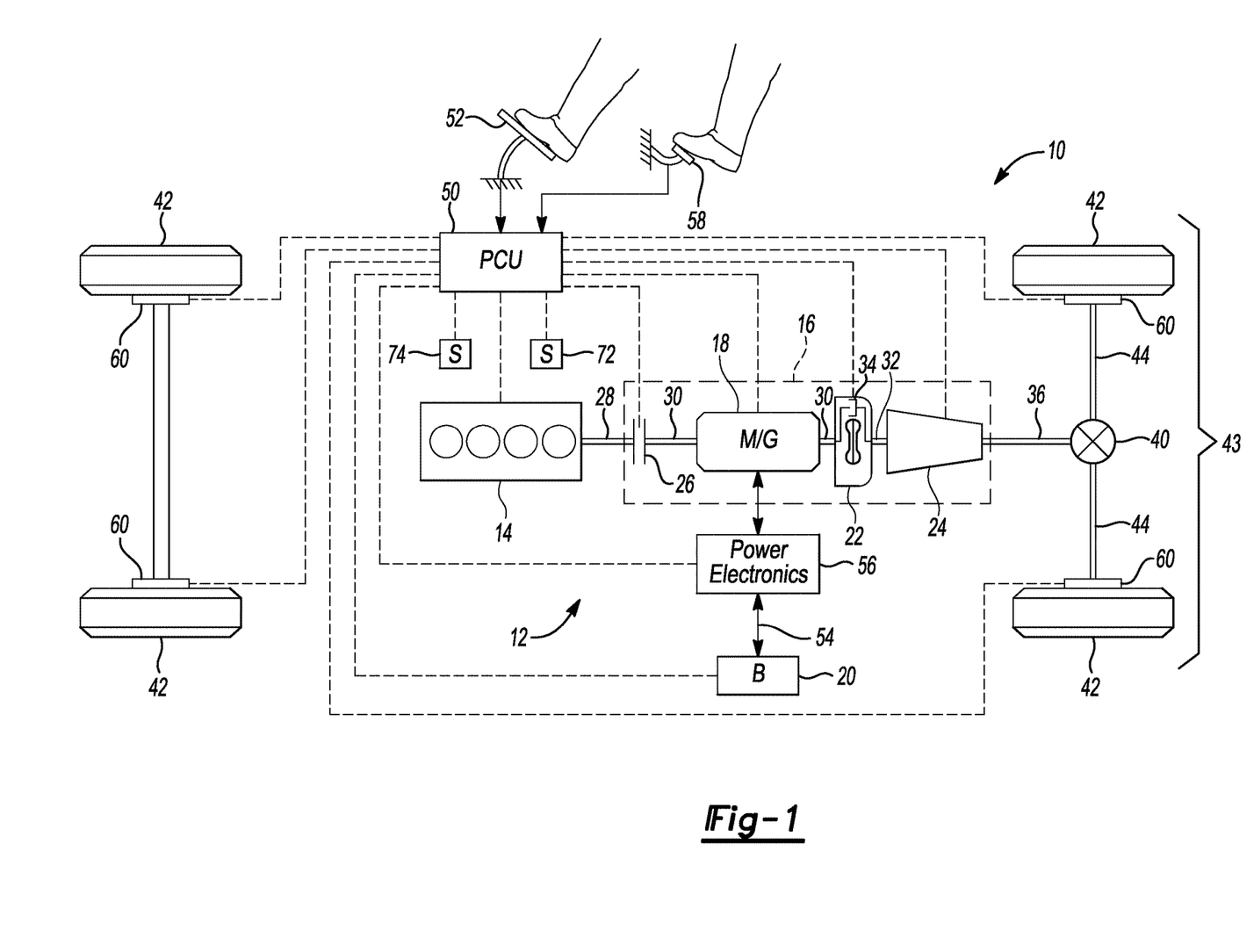
FIG. 1 is a schematic illustration of an exemplary powertrain of a hybrid/electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24. The engine 14 and the M/G 18 may be referred to as powerplants.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). For example, the gearbox 24 may be upshifted from a lower gear to a higher gear (e.g., from $3^{rd}$ gear to $4^{th}$ gear) during acceleration or may be downshifted from a higher gear to a lower gear (e.g., from $5^{th}$ gear to $4^{th}$ gear) when the vehicle is slowing down. Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective half shaft 44 connected to the differential 40. The differential 40 may be an open differential. The transmission output shaft 36 may also be referred to as an input shaft to the differential 40 and the half shafts 44 may be referred to as an output from the differential. Shaft 36, differential 40, half shafts 44 and a pair of the wheels 42 may form an axle 43. The vehicle may also include a second pair of wheels 42 that are not part of axle 43. The differential transmits approximately equal torque to each wheel 42 while permitting slight speed differences such as when the vehicle turns a corner. Each of the wheels 42 have tires that contact the road surface to propel the HEV 10. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60, which may be disposed about each wheel 42. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking where the M/G 18 is utilized to slow the HEV 10. During regenerative braking torque and rotational energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

For example, the configuration may include a single electric machine (e.g., M/G 18) that is connected to an open differential (e.g., differential 40) through an input shaft to the differential (i.e., shaft 36) and may include first and second wheels (i.e., wheels 42) that are each secured to one of the two output shafts of the open differential (i.e., half shafts 44). In this example, the open (or unlocked) differential is configured to provide the same torque (rotational force) to each of the half shafts and their respective wheels. A transmission (e.g., gearbox 24) and/or torque converter (e.g., torque converter 22) may be disposed between the electric machine and the open differential in this example configuration.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, vehicles powered only by an engine, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Furthermore, the vehicle 10 may be a four-wheel drive vehicle that includes a transfer case and a drive shaft that may be connect the front axle to the power sources (e.g., engine 14 and M/G 18). Under such a configuration, the front axle may include a differential that is connected to the wheels of the front axle via half shafts. The drive shaft may connect the transfer case to the differential of the front axle. The transfer case may be configured to connect and disconnect the drive shaft from the power sources.

In off-road situations, or even in some situations during normal driving, one or more wheels can be unloaded, lofted, or may experience large amounts of slip. Certain off-road modes and driveline settings turn off or modify vehicle stability control settings changing the if and how traction control can intervene. When forward or reverse tractive capability is limited, drivers may apply more throttle. Lofted tires, or tires with significantly lower tractive capability (low mu) may achieve very high rotational velocities, particularly when traction control is reduced or turned off. When wheel speeds flare relative to the true vehicle speed, in any situation (not just off road), drivers may rapidly apply the brakes. This rapid application of brakes can reduce wheel speed at too high of a rate and cause drivetrain fracture (e.g., damage or fracture to rotating components such as drive shafts or gears) especially in powertrains with high rotational inertia. This issue may be further amplified on truck applications when in low-gear four-wheel drive (4 L) where there is additional gear multiplication, which increases the powertrain inertia even further. The same situations and solutions can be applied to four-wheel or front-wheel drive vehicles. Rapid application of brakes to an unloaded wheel will result in a rapid decrease in speed to that wheel and the associated driveline components.

Figures 2A, 2B, 2C:
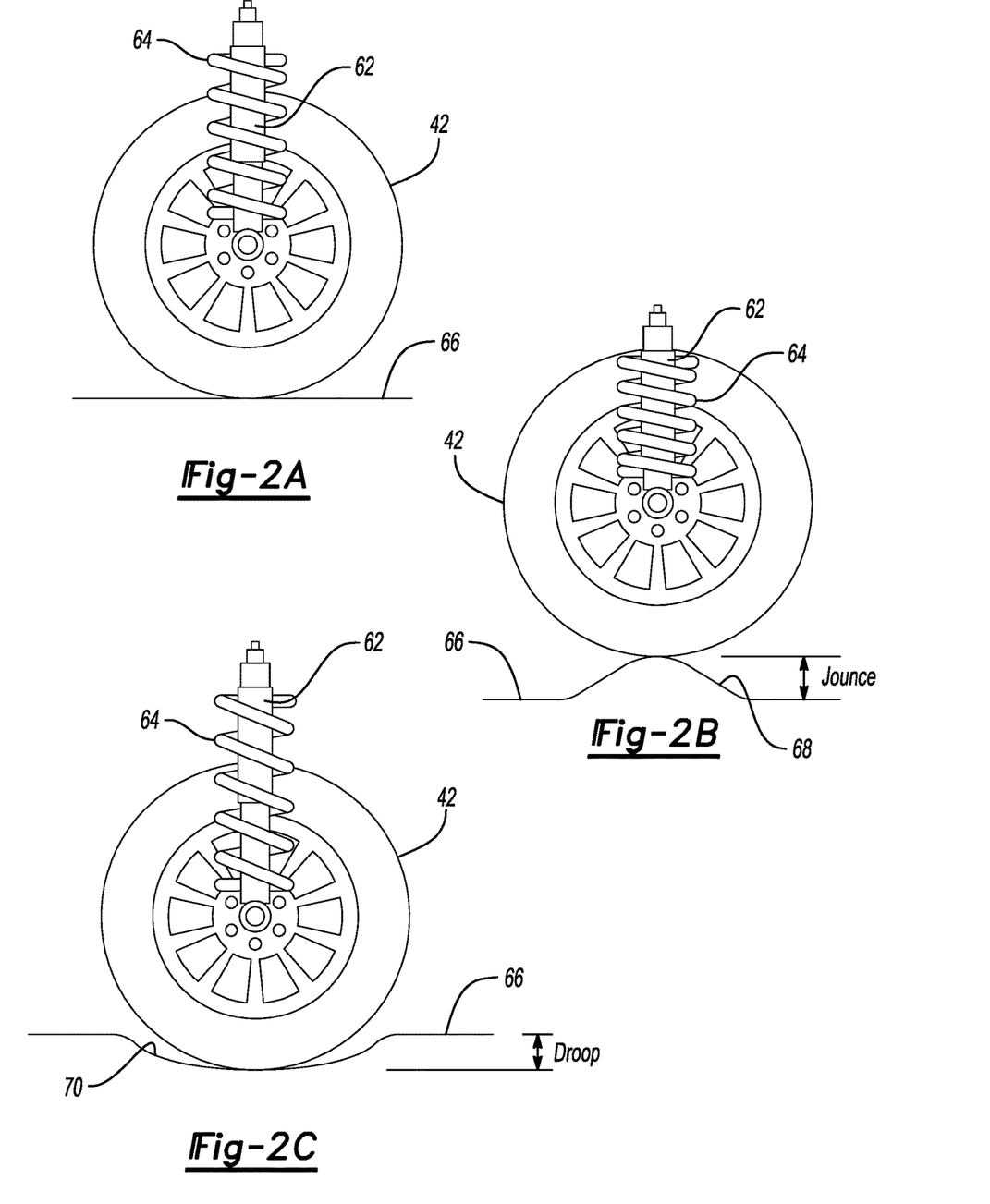
FIGS. 2A-2C illustrate various positions of the wheels of the vehicle.

Referring to FIGS. 2A-2C, various positions of the wheels 42 of the vehicle 10 are illustrated. Each wheel 42 is connected to a suspension system that includes a shock or strut 62 and a spring 64. The spring 64 along with a portion of the weight of the vehicle 10 experienced at each wheel 42 are meant to maintain the wheel in a neutral or home position (e.g., a position where the weight of the vehicle and the load on the spring 64 are balanced such that the position of the wheel 42 remains static). The neutral or home position is illustrated in FIG. 2A with the wheel 42 resting on a flat surface 66.

When the wheel 42 encounters a deviation from a flat surface 66 such as a bump 68 (e.g., FIG. 2B), the wheel 42 moves upward, energy is absorbed by the strut 62, and stored in the spring 64. When the wheel 42 has traversed the deviation that caused the upward movement, the energy stored in the spring 64 and the portion of the weight of the vehicle 10 experienced at the wheel 42 returns the wheel 42 to the neutral or home position. Such a return to the neutral or home position may be referred to as rebound. A deviation upward from the neutral or home position may be referenced by a distance the wheel 42 has traveled upward from the neutral or home position, which is known as jounce.

When the wheel 42 encounters a deviation from a flat surface 66 such as a recess 70 (e.g., FIG. 2C), the wheel 42 moves downward, energy is absorbed by the strut 62, and preloaded energy from the weight of the vehicle 10 is released from the spring 64. When the wheel 42 has traversed the deviation that caused the downward movement, the weight of the vehicle 10 experienced at the wheel 42 reloads the spring 64 and returns the wheel 42 to the neutral or home position. A deviation downward from the neutral or home position may be referenced by a distance the wheel 42 has traveled downward from the neutral or home position, which is known as droop.

The amount of jounce or droop may be measured by a sensor 72 (See FIG. 1) that determines the relative travel (either jounce or droop) of the wheel 42 from the neutral or home position. The sensor 72 may then communicate the relative travel of the wheel 42 to the controller 50. More specifically, the sensor 72 may be secured to the strut 62 and may measure the distance the strut 62 has traveled from the neutral or home position to determine the relative travel of the wheel 42 from the neutral or home position. Additionally, or in the alternative, the load each wheel 42 is experiencing may be derived from the pitch rate, roll rate, and/or yaw rate, which may be measured by one or more sensors 74, which is then communicated to the controller 50. More specifically, the one or more sensors 74 may be accelerometers and the load each wheel 42 is experiencing may be correlated with the distance of travel from the neutral or home position. Such a relationship between the load at each wheel and the distance of travel from the neutral or home position may be a linear relationship. For example, the distance of travel from the neutral or home position may be equal to the product of (i) the spring constant of spring 64 and (ii) a difference between a current load on the wheel 42 and the load on the wheel 42 in the neutral or home position.

Figure 3:
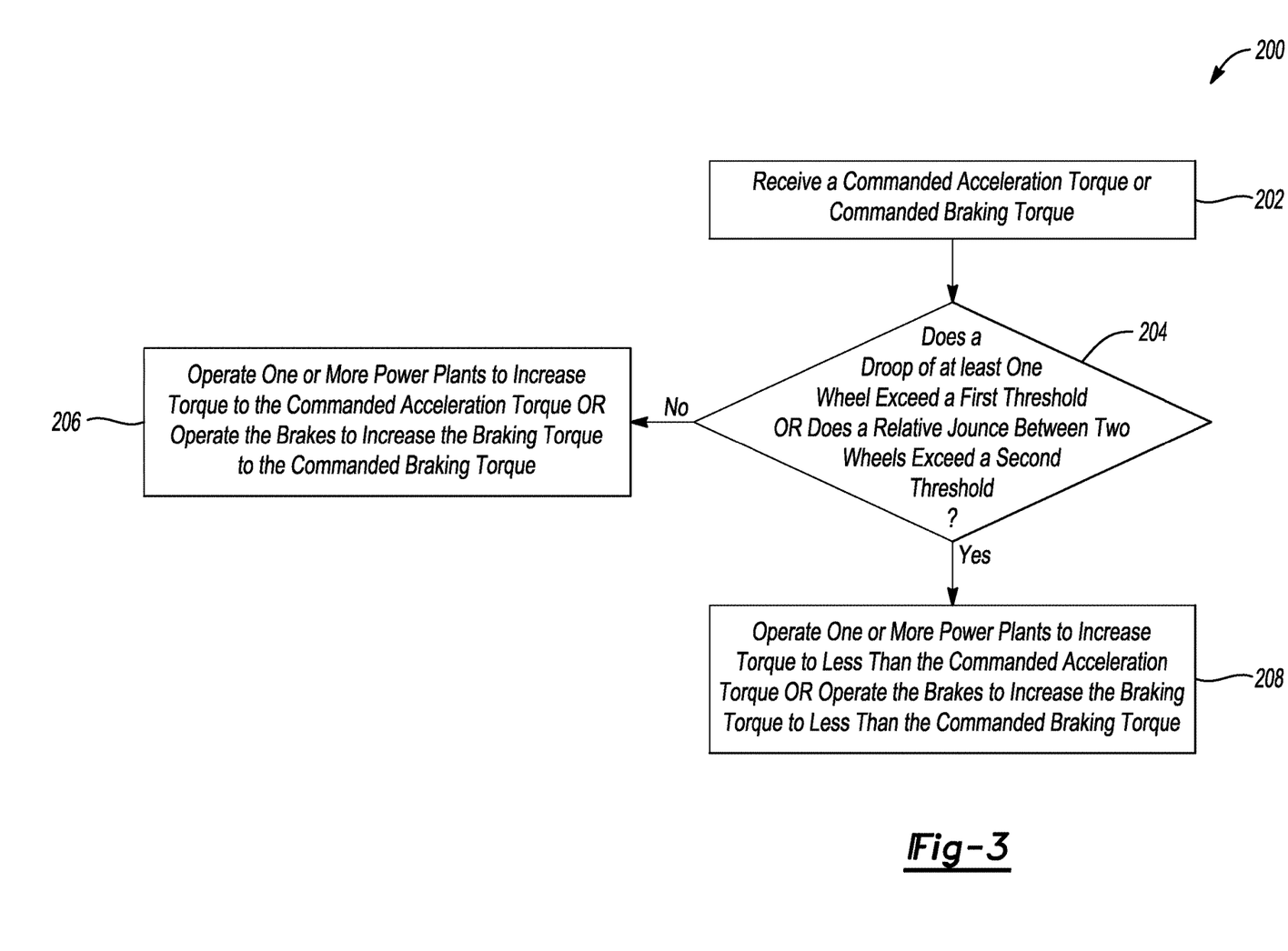
FIG. 3 is a flowchart illustrating a method of controlling the torque being delivered to the wheels based on the various positions of the wheels.

Referring to FIG. 3, a flowchart of a method 200 for controlling the torque being delivered to the wheels 42 is illustrated. The method 200 may be stored as control logic and/or an algorithm within one or more of the vehicle controllers (e.g., controller 50). The method 200 is initiated at block 202, where (i) a commanded acceleration toque is received to accelerate the vehicle 10 or (ii) a commanded braking torque is received to slow the vehicle 10. The commanded acceleration toque may be generated via the depressing the accelerator pedal 52 and the commanded braking torque may be generated via depressing the brake pedal 58. The commanded acceleration toque and the commanded braking torque may each more specifically be commanded torque values at the wheels 42 of the vehicle. The commanded braking torque may refer to friction braking torque applied via the friction brakes 60, regenerative braking torque applied via the M/G 18, or a combination of friction braking and regenerative braking.

Next, the method 200 moves on to block 204, where it is determined if the droop of at least one wheel 42 exceeds a first threshold or if a relative jounce between two of the wheels 42 exceeds a second threshold. Relative jounce between two wheels may refer to the difference in jounce between two wheels if measured from the neutral or home position. Also, when considering relative jounce, a wheel that is in jounce may be assigned a positive distance value from the neutral or home position while a wheel that is in droop may be assigned a negative distance value from the neutral or home position. The first and the second thresholds may have the same or different values. Also, the first and second thresholds may have the same values or different values depending on whether a commanded acceleration torque or a commanded braking torque was generated at block 202.

If it is determined that the that the droop of each wheel 42 and the relative jounce between each wheel 42 is less than the first threshold and the second threshold, respectively, the method 200 moves on to block 206. At block 206, if the command at block 202 had been a commanded acceleration torque, the one or more powerplants (e.g., engine 14 or M/G 18) of the vehicle 10 will be operated to increase the torque (e.g., accelerating wheel torque) to the commanded acceleration torque. At block 206, if the command at block 202 had been a commanded braking torque, the brakes (e.g., the friction brakes 60 utilizing friction braking or the M/G 18 utilizing regenerative braking) of the vehicle 10 will be operated to increase the torque (e.g., braking wheel torque) to the commanded braking torque.

Returning to block 204, if it is determined that the droop of at least one wheel 42 or the relative jounce between two of the wheels 42 exceeds the first threshold or the second threshold, respectively, the method moves on to block 208. At block 208, if the command at block 202 had been a commanded acceleration torque, the one or more powerplants (e.g., engine 14 or M/G 18) of the vehicle 10 will be operated to increase the torque (e.g., accelerating wheel torque) to less than the commanded acceleration torque. At block 208, if the command at block 202 had been a commanded braking torque, the brakes (e.g., the friction brakes 60 utilizing friction braking or the M/G 18 utilizing regenerative braking) of the vehicle 10 will be operated to increase the torque (e.g., braking wheel torque) to less than the commanded braking torque.

It should be understood that the flowchart in FIG. 3 is for illustrative purposes only and that the method 200 should not be construed as limited to the flowchart in FIG. 3. Some of the steps of the method 200 may be rearranged while others may be omitted entirely. For example, (i) the method 200 may only consider a commanded acceleration torque at block 202 and not consider a commanded braking torque, (ii) the method 200 may only consider a commanded braking torque at block 202 and not consider a commanded acceleration torque, (iii) the method 200 may only consider droop values and ignore the relative jounce values, (iv) the method 200 may only consider the relative jounce values and ignore the droop values.

If the method 200 where to only consider the commanded acceleration torque or the commanded braking torque, the "or" requirement of the method 200 will be ignored at block 202. If the method 200 where to only consider the droop values or the relative jounce values, the "or" requirement of the method 200 will be ignored at blocks 204, 204, and 208 and the "and" requirement (i.e., that the droop of each wheel 42 and that the relative jounce between each wheel 42 be less than the first threshold and the second threshold, respectively) to transition to block 206 will also be ignored.

Figure 4:
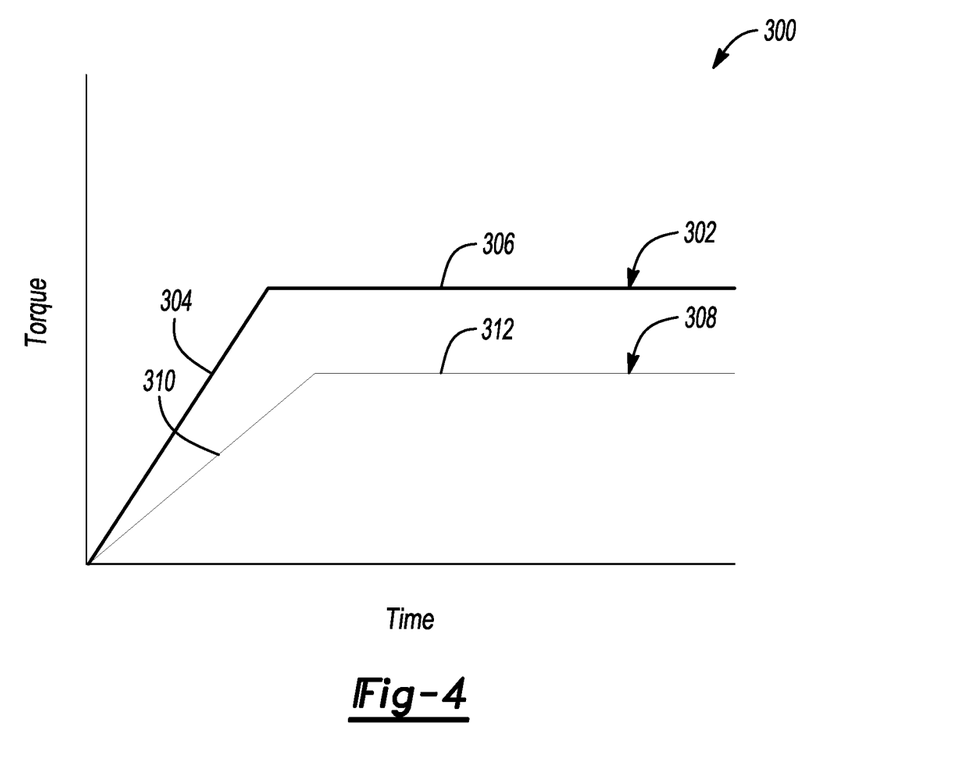
FIG. 4 is a series of graphs illustrating the torque being delivered to the wheels according to the method and under various scenarios.

Referring now to FIG. 4, series of graphs 300 illustrating the torque being delivered to the wheels 42 according to the method 200 and under various scenarios is illustrated. Line 302 illustrates either the commanded acceleration torque or the commanded braking torque. Line 302 includes both a ramping portion 304 and a desired or maximum output torque 306. In response to either the commanded acceleration torque or the commanded braking torque and the method 200 transitioning to block 206, the torque being delivered to the wheels 42 is increased at a first rate according to the ramping portion 304 to the desired or maximum output torque 306 where the torque may remain constant thereafter during the acceleration or braking event.

Line 308 includes both a ramping portion 310 and a reduced desired or maximum output torque 312. In response to either the commanded acceleration torque or the commanded braking torque and the method 200 transitioning to block 208, the torque being delivered to the wheels 42 is increased at a second rate according to the ramping portion 310 to the reduced desired or maximum output torque 312 where the torque may remain constant thereafter during the acceleration or braking event.

The second rate at which torque is increased during the ramping portion 310 is less than the first rate at which torque is increased during the ramping portion 304. The reduced desired or maximum output torque 312 is less than the desired or maximum output torque 306. Lines 308 and 302 demonstrate that (i) the rate at which the acceleration torque or braking torque increases and (ii) the desired or maximum output of the acceleration torque or braking torque are both reduced when the method 200 transitions to block 208 as opposed to transitioning to block 206.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
   a plurality of wheels;

a powerplant configured to generate a wheel torque within at least one of the wheels of plurality of wheels to propel the vehicle;

brakes configured to generate a braking wheel torque within at least one of the wheels of the wheels of the plurality of wheels;

an accelerator pedal;

a brake pedal; and a controller programed to, in response to (i) depressing the accelerator pedal to generate a desired wheel torque and (ii) a droop of least one wheel or a relative jounce between two wheels exceeding a first threshold or a second threshold, respectively, operate the powerplant to increase the wheel torque to less than the desired wheel torque, in response to (i) depressing the accelerator pedal to generate the desired wheel torque and (ii) the droop of each wheel and the relative jounce between each wheel being less than the first threshold and the second threshold, respectively, operate the powerplant to increase the wheel torque to the desired wheel torque, in response to (i) depressing the brake pedal to generate a desired braking wheel torque and (ii) the droop of least one wheel or the relative jounce between two wheels exceeding the first threshold or the second threshold, respectively, operate the brakes to increase the braking wheel torque to less than the desired braking wheel torque, and in response to (i) depressing of the brake pedal to generate the desired braking wheel torque and (ii) the droop of each wheel and the relative jounce between each wheel being less than the first threshold and the second threshold, respectively, operate the brakes to increase the braking wheel torque to the desired braking wheel torque.

2. The vehicle of claim 1, wherein the controller is further programmed to, in response to (i) depressing the accelerator pedal to generate the desired wheel torque and (ii) the droop of least one wheel or the relative jounce between two wheels exceeding the first threshold or the second threshold, respectively, reduce a rate at which the wheel torque increases.

3. The vehicle of claim 1, wherein the controller is further programmed to, in response to (i) depressing the accelerator pedal to generate the desired wheel torque and (ii) the droop of least one wheel or the relative jounce between two wheels exceeding the first threshold or the second threshold, respectively, reduce a maximum output of the wheel torque.

4. The vehicle of claim 1, wherein the controller is further programmed to, in response to (i) depressing the brake pedal to generate the desired braking wheel torque and (ii) the droop of least one wheel or the relative jounce between two wheels exceeding the first threshold or the second threshold, respectively, reduce a rate at which the braking wheel torque increases.

5. The vehicle of claim 1, wherein the controller is further programmed to, in response to (i) depressing the brake pedal to generate the desired braking wheel torque and (ii) the droop of least one wheel or the relative jounce between two wheels exceeding the first threshold or the second threshold, respectively, reduce a maximum output of the braking wheel torque.

6. A vehicle comprising:

wheels configured to propel the vehicle:

brakes configured to generate a braking torque at the wheels; and a controller programed to, in response to (i) a commanded braking torque and (ii) a droop of at least one of the wheels exceeding a threshold, operate the brakes to increase the braking torque to less than the commanded braking torque, in response to (i) the commanded braking torque and (ii) the droop of each of the wheels being less than the threshold, operate the brakes to increase the braking torque to the commanded braking torque, and in response to (i) the commanded braking torque and (ii) a relative jounce between two of the wheels exceeding a second threshold, operate the brakes to increase the braking torque to less than the commanded braking torque.

7. The vehicle of claim 6, wherein the controller is further programmed to, in response to (i) the commanded braking torque and (ii) the droop of at least one of the wheels exceeding the threshold, reduce a rate at which the braking torque increases.

8. The vehicle of claim 6, wherein the controller is further programmed to, in response to (i) the commanded braking torque and (ii) the droop of at least one of the wheels exceeding the threshold, reduce a maximum output of the braking torque.

9. The vehicle of claim 6, wherein the controller is further programmed to, in response to (i) the commanded braking torque and (ii) the relative jounce between each of the wheels being less than the threshold, operate the brakes to increase the braking torque to the commanded braking torque.

10. The vehicle of claim 6, wherein the controller is further programmed to, in response to (i) the commanded braking torque and (ii) the relative jounce between two of the wheels exceeding the second threshold, reduce a rate at which the braking torque increases.

11. The vehicle of claim 6, wherein the controller is further programmed to, in response to (i) the commanded braking torque and (ii) the relative jounce between two of the wheels exceeding the second threshold, reduce a maximum output of the braking torque.

12. A vehicle comprising:

wheels configured to propel the vehicle:

brakes configured to generate a braking torque at the wheels; and a controller programed to, in response to (i) a commanded braking torque and (ii) a relative jounce between two of the wheels exceeding a threshold, operate the brakes to increase the braking torque to less than the commanded braking torque.

13. The vehicle of claim 12, wherein the controller is further programmed to, in response to (i) the commanded braking torque and (ii) the relative jounce between each of the wheels being less than the threshold, operate the brakes to increase the braking torque to the commanded braking torque.

14. The vehicle of claim 12, wherein the controller is further programmed to, in response to (i) the commanded braking torque and (ii) the relative jounce between two of the wheels exceeding the threshold, reduce a rate at which the braking torque increases.

15. The vehicle of claim 12, wherein the controller is further programmed to, in response to (i) the commanded braking torque and (ii) the relative jounce between two of the wheels exceeding the threshold, reduce a maximum output of the braking torque.

16. The vehicle of claim 12, wherein the controller is further programmed to, in response to (i) the commanded braking torque and (ii) a droop of at least one of the wheels exceeding a second threshold, operate the brakes to increase the braking torque to less than the commanded braking torque.

17. The vehicle of claim 16, wherein the controller is further programmed to, in response to (i) the commanded braking torque and (ii) the droop of each of the wheels being less than the threshold, operate the brakes to increase the braking torque to the commanded braking torque.

18. The vehicle of claim 16, wherein the controller is further programmed to, in response to (i) the commanded braking torque and (ii) the droop of at least one of the wheels exceeding the threshold, reduce a rate at which the braking torque increases.

19. The vehicle of claim 16, wherein the controller is further programmed to, in response to (i) the commanded braking torque and (ii) the droop of at least one of the wheels exceeding the threshold, reduce a maximum output of the braking torque.

\* \* \* \* \*